US009504984B2

United States Patent
Northrop

(10) Patent No.: US 9,504,984 B2
(45) Date of Patent: Nov. 29, 2016

(54) GENERATING ELEMENTAL SULFUR

(71) Applicant: P. Scott Northrop, Spring, TX (US)

(72) Inventor: P. Scott Northrop, Spring, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 6 days.

(21) Appl. No.: 14/643,726

(22) Filed: Mar. 10, 2015

(65) Prior Publication Data
US 2015/0291421 A1    Oct. 15, 2015

Related U.S. Application Data

(60) Provisional application No. 61/977,503, filed on Apr. 9, 2014.

(51) Int. Cl.
C01B 17/04    (2006.01)
C10L 3/10    (2006.01)
(Continued)

(52) U.S. Cl.
CPC ........ B01J 19/2425 (2013.01); C01B 17/0408 (2013.01); C01B 17/0417 (2013.01); C01B 17/0447 (2013.01); *B01J 2219/00006* (2013.01); *B01J 2219/00085* (2013.01)

(58) Field of Classification Search
CPC .......... C01B 17/0404; C01B 17/0408; C01B 17/0426; C01B 17/043; B01J 19/00; B01J 19/24; B01J 19/242; B01J 2219/00085; B01J 2219/00006; C10L 3/102; C10L 3/103
See application file for complete search history.

(56) References Cited

U.S. PATENT DOCUMENTS 2,939,769 A * 6/1960 Webb .................. C01B 17/0404
165/145
3,552,927 A * 1/1971 Franklin et al. .... C01B 17/0447
422/206
(Continued)

FOREIGN PATENT DOCUMENTS

EP    0508244 A1    10/1992    ............. B01D 53/34
FR    2893515 A1 *  5/2007    ........... B01D 53/002
(Continued)

OTHER PUBLICATIONS

U.S. Appl. No. 14/516,683, filed Oct. 17, 2014, Valencia, J. A. et al.
(Continued)

Primary Examiner — Timothy Vanoy
(74) Attorney, Agent, or Firm — ExxonMobil Upstream Research Company-Law Department

(57) ABSTRACT

Techniques for generating elemental sulfur are provided herein. The disclosed methods may include a gas processing system including a processed feed gas. The methods may include a distillation column configured to receive the processed feed gas and to generate a high-pressure acid gas stream. The methods may include a reactor configured to partially combust the high-pressure acid gas stream to generate a limiting reactant. The methods may include a plurality of reactors configured with a shell side and a plurality of reaction tubes, where a reaction between the high-pressure acid gas stream and the limiting reactant produces a partially-reacted high-pressure acid gas containing elemental sulfur. The methods may include a plurality of condensers configured to condense the elemental sulfur. The methods may include a plurality of separators configured to separate out the partially-reacted high-pressure acid gas stream to recover elemental sulfur.

23 Claims, 10 Drawing Sheets

(51) Int. Cl.
*B01J 19/00* (2006.01)
*B01J 19/24* (2006.01)

(56) References Cited

U.S. PATENT DOCUMENTS

| | | | |
|---|---|---|---|
| 4,370,156 A | 1/1983 | Goddin et al. | 62/17 |
| 4,459,142 A | 7/1984 | Goddin | 62/17 |
| 4,533,372 A | 8/1985 | Valencia et al. | 62/12 |
| 4,831,206 A | 5/1989 | Zarchy | 585/737 |
| 4,923,493 A | 5/1990 | Valencia et al. | 62/13 |
| 4,935,043 A * | 6/1990 | Blanc | C07C 7/11 62/625 |
| 5,062,270 A | 11/1991 | Haut | 62/12 |
| 5,120,338 A | 6/1992 | Potts et al. | 62/12 |
| 5,265,428 A | 11/1993 | Valencia et al. | 62/36 |
| 5,486,227 A | 1/1996 | Kumar et al. | 95/41 |
| 5,820,837 A | 10/1998 | Marjanovich et al. | 423/220 |
| 5,956,971 A | 9/1999 | Cole et al. | 62/623 |
| 6,053,007 A | 4/2000 | Victory et al. | 62/619 |
| 6,416,729 B1 | 7/2002 | DeBerry et al. | 423/573.1 |
| 6,818,194 B2 | 11/2004 | DeBerry et al. | 423/228 |
| 7,121,115 B2 * | 10/2006 | Lemaire | C10L 3/102 62/625 |
| 7,635,408 B2 | 12/2009 | Mak et al. | 95/187 |
| 7,955,496 B2 | 6/2011 | Iqbal et al. | 208/129 |
| 2004/0107728 A1 | 6/2004 | Lemaire et al. | 62/622 |
| 2008/0019899 A1 | 1/2008 | Mak et al. | 423/737.1 |
| 2008/0034789 A1 | 2/2008 | Fieler et al. | 62/623 |
| 2008/0107581 A1 | 5/2008 | Sparling et al. | 423/222 |
| 2009/0220406 A1 | 9/2009 | Rahman | 423/437.1 |
| 2009/0266107 A1 | 10/2009 | Singh et al. | 62/623 |
| 2010/0018248 A1 | 1/2010 | Fieler et al. | 62/617 |
| 2010/0310439 A1 | 12/2010 | Brok et al. | 423/222 |
| 2012/0031144 A1 * | 2/2012 | Northrop | C10L 3/10 62/617 |
| 2012/0065450 A1 * | 3/2012 | Diaz | B01D 3/143 585/802 |
| 2012/0079852 A1 | 4/2012 | Northrop et al. | 62/620 |
| 2012/0125043 A1 | 5/2012 | Cullinane et al. | 62/620 |
| 2012/0204599 A1 * | 8/2012 | Northrop | C10L 3/10 62/617 |
| 2012/0251436 A1 * | 10/2012 | Alkhazov | C01B 17/0404 423/574.1 |
| 2012/0279728 A1 | 11/2012 | Northrop et al. | 166/401 |
| 2013/0074541 A1 | 3/2013 | Kaminsky et al. | 62/601 |
| 2013/0098105 A1 * | 4/2013 | Northrop | C10L 3/102 62/617 |
| 2014/0137599 A1 | 5/2014 | Oelfke et al. | 62/619 |
| 2014/0338395 A1 | 11/2014 | Oelfke et al. | 62/620 |
| 2015/0013377 A1 | 1/2015 | Oelfke | 62/602 |

FOREIGN PATENT DOCUMENTS

| | | | |
|---|---|---|---|
| WO | WO 2008/091316 | 7/2008 | F25J 3/00 |
| WO | WO 2009/052042 | 4/2009 | F25J 1/00 |
| WO | WO 2012/057925 | 5/2012 | B01D 53/52 |

OTHER PUBLICATIONS

U.S. Appl. No. 14/516,686, filed Oct. 17, 2014, Valencia, J. A.
U.S. Appl. No. 14/516,689, filed Oct. 17, 2014, Cullinane, J. T. et al.
U.S. Appl. No. 14/516,705, filed Oct. 17, 2014, Valencia, J. A. et al.
U.S. Appl. No. 14/516,709, filed Oct. 17, 2014, Valencia, J. A.
U.S. Appl. No. 14/516,713, filed Oct. 17, 2014, Valencia, J. A. et al.
U.S. Appl. No. 14/516,717, filed Oct. 17, 2014, Valencia, J. A. et al.
U.S. Appl. No. 14/516,718, filed Oct. 17, 2014, Valencia, J. A.
U.S. Appl. No. 14/516,726, filed Oct. 17, 2014, Valencia, J. A. et al.
U.S. Appl. No. 14/516,731, filed Oct. 17, 2014, Valencia, J. A. et al.
Northrop, P. Scott et al. (2004) "Cryogenic Sour Gas Process Attractive for Acid Gas Injection Applications," *83rd Ann. Gas Processors Assoc. Convention, New Orleans, LA.*, pp. 1-8 (XP007912217).
Valencia, J. A. et al. (2008) "Controlled Freeze Zone™ Technology for Enabling Processing of High $CO_2$ and $H_2S$ Gas Reserves," SPE-IPTC 12708, Kuala Lumpur, IN, v.4.1, Jan. 2008, pp. 2358-2363.
Thomas, E. R. et al. (1988) "Conceptual Studies for $CO_2$/Natural Gas Separation Using the Control Freeze Zone (CFZ) Process," *Gas Separation and Purification*, v. 2, pp. 84-89.

\* cited by examiner

700

GENERATING ELEMENTAL SULFUR

CROSS REFERENCE TO RELATED APPLICATIONS

This application claims the priority benefit of U.S. patent application No. 61/977,503 filed Apr. 9, 2014 entitled GENERATING ELEMENTAL SULFUR, the entirety of which is incorporated by reference herein.

FIELD

The present techniques provide for the generation of elemental sulfur ($S_8$). More specifically, the present techniques provide for the generation of elemental $S_8$ from a high-pressure acid gas by utilizing a Claus process with shell-and-tube reactors designed to remove a substantial amount of heat of reaction.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

The production of hydrocarbons from a reservoir oftentimes carries with it the incidental production of non-hydrocarbon gases. Such gases include contaminants such as hydrogen sulfide ($H_2S$) and carbon dioxide ($CO_2$). When either $H_2S$ or $CO_2$ is produced as part of a hydrocarbon gas stream, such as methane or ethane, the raw natural gas is sometimes referred to as a "sour" natural gas. The $H_2S$ and $CO_2$ are often referred to together as "acid gases."

The sour natural gas may be treated to remove the $H_2S$, $CO_2$, and other contaminants before it can be used as an environmentally-acceptable fuel. For "highly sour" natural gases (e.g., >20% $CO_2+H_2S$), it can be particularly challenging to design, construct, and operate a process that can economically separate these contaminants from the desired hydrocarbons. In many cases, the acid gas, which primarily contains $H_2S$ and $CO_2$, may be sent to a sulfur recovery unit (SRU) to convert the toxic $H_2S$ into benign elemental sulfur, while the $CO_2$ is usually just vented to the atmosphere. In certain instances, the $CO_2$ could be captured, stored, and later sold for commercial use as a measure to prevent the introduction of nitrogen into the stream.

The Claus process is the most widely used process for the conversion of $H_2S$ to elemental $S_8$, which can later be sold as a separate product from the natural gas. The acid gas that is fed to the Claus process is converted in two stages, a thermal stage, and a catalytic stage. The process can include multistage catalytic oxidation of $H_2S$ resulting in the following net overall reaction:

$$3H_2S + 1.5O_2 \rightarrow 3H_2O + 3S \qquad (1)$$

To provide the necessary amount of oxidative component, the first step in the Claus process is the combustion of one-third of the $H_2S$ in the acid gas to form sulfur dioxide ($SO_2$) in the thermal stage:

$$H_2S + 1.5O_2 \rightarrow SO_2 + H_2O \qquad (2)$$

FIG. 1 is a block diagram of the conventional Claus process where in the thermal stage, a low-pressure acid gas 102 may flow into a reaction furnace 104. In the reaction furnace 104, sufficient combustion air 106 may be introduced to burn about one-third of the $H_2S$. The hot, partially-combusted acid gas, which may contain $H_2S$, $SO_2$, and gaseous sulfur (S), leaving the reaction furnace 104 may be used to produce steam in a waste heat boiler 108 resulting in the cooling of the acid gas. As shown in FIG. 1, reaction furnace 104 and waste heat boiler 108 may be shown as a single component since both may be housed in a single unit and heated by the same heater. The partially-combusted acid gas may be further cooled and condensed in a condenser 110 to form an unreacted acid gas stream 112. This condenser 110 also condenses gaseous $S_x$ generated during the conversion of $H_2S$ to form liquid $S_x$ 114, where x is typically an integer from 2 to 8. The liquid $S_x$ 114 may be separated from the overhead unreacted acid gas stream 112, and removed from an outlet on the condenser 110. In this thermal stage, the pressure and temperature of the reaction furnace 104 may be maintained at about 5 to 15 psig (0.3-1 bar) and about 1800° F. (1,000° C.), respectively. At those conditions, the Claus reaction occurs thermally in the reaction furnace 104 without requiring any catalyst. Under such conditions, about 70% of the $H_2S$ in the acid gas 102 may be thermally converted into elemental $S_x$ 114 within the reaction furnace 104.

The unreacted acid gas stream 112 enters the catalytic stage at a relatively low pressure. A portion of the remaining unreacted two-thirds $H_2S$ in the acid gas may be converted in the catalytic stage to form elemental $S_2$ as follows:

$$2H_2S + SO_2 \rightarrow 2H_2O + 3S \qquad (3)$$

Summing reaction (2) with reaction (3) yields reaction (1).

As shown in FIG. 1, the low-pressure unreacted acid gas stream 112 from the condenser 110 may be directed to and processed in a reheater 116, a catalytic reactor 118, and a condenser 120 within the catalytic section configured to separate $S_x$ 119. The sequence of gas reheat 122, catalytic reaction 124, condensation 126, and separation of liquid $S_x$ 128 may be repeated in numerous catalytic stages at successively lower reactor temperatures. The remaining gas separated from the last condenser 126 is referred to as a tail gas 130 and may be burned in an incinerator or further desulfurized in a tail gas treatment unit (TGTU). For a well-designed Claus sulfur recovery plant having two or more catalytic reactors, an overall conversion of at least 95% of $H_2S$ to $S_x$ can be achieved.

Alberta Sulfur Research, Ltd (ASRL) has recently described a process in which $H_2S$ is converted to elemental $S_x$ at elevated pressures in a molten sulfur medium. However, the ASRL process is only intended for small tonnages of sulfur (<10 tons per day) and is not amenable to large acid gas streams.

Another process technique using high pressure acid gas pertains to larger amounts of $H_2S$ while maintaining $CO_2$ at a high pressure for facile injection. This process involves the use of an ancillary solvent, which adds complexity to the process. Accordingly, there is a need for a process that is capable of processing a high-pressure acid gas under elevated heat of reaction conditions and recovering $CO_2$ for viable downhole injection for a disposal process or for an enhanced oil recovery (EOR) process.

SUMMARY

An exemplary embodiment provides a system for generating elemental sulfur. The system includes a gas processing system to provide a processed feed gas and a distillation column configured to receive the processed feed gas and to generate a high-pressure acid gas stream. The system includes a heater configured to partially combust the high-pressure acid gas stream to generate a limiting reactant. The system includes a plurality of reactors configured with a tube side including a plurality of reaction tubes and a shell side. Within the plurality of reactors, a reaction between the high-pressure acid gas stream and the limiting reactant may produce a partially-reacted high-pressure acid gas containing elemental sulfur. The system includes a plurality of condensers configured to condense the elemental sulfur. The system also includes a plurality of separators configured to separate out the partially-reacted high-pressure acid gas stream to recover elemental sulfur.

Another exemplary embodiment provides a system for generating elemental sulfur from a high-pressure acid gas stream. The system includes a distillation column configured to provide a high-pressure liquid acid gas stream, where the high-pressure liquid acid gas stream is fed to a heater to produce a bottoms high-pressure acid gas stream. The system includes a plurality of shell and tube reactors injected with the bottoms high-pressure acid gas stream and a recirculating solvent where dissolved elemental sulfur is produced in an exothermic reaction. The system also includes a plurality of coolers to crystallize the dissolved elemental sulfur and to separate the crystallized elemental sulfur from gaseous products formed in each of the plurality of shell and tube reactors.

Another exemplary embodiment provides a method for generating elemental sulfur including providing a processed feed gas stream. The method includes generating a liquid high-pressure acid gas stream from the processed feed gas stream, where the liquid high-pressure acid gas stream comprises $H_2S$ and $CO_2$. The method includes partially combusting the liquid high-pressure acid gas stream with a limiting reactant in a shell and tube reactor to produce a gaseous high-pressure gas stream containing elemental sulfur. The method includes removing excess heat of reaction using the shell and tube reactor generated during the production of the gaseous high-pressure gas stream and cooling the gaseous high-pressure gas stream to provide a liquid high-pressure gas stream. The method also includes separating the liquid high-pressure gas stream out of the gaseous high-pressure gas stream to recover elemental sulfur.

DESCRIPTION OF THE DRAWINGS

The advantages of the present techniques are better understood by referring to the following detailed description and the attached drawings, in which.

DETAILED DESCRIPTION

Figure 1:
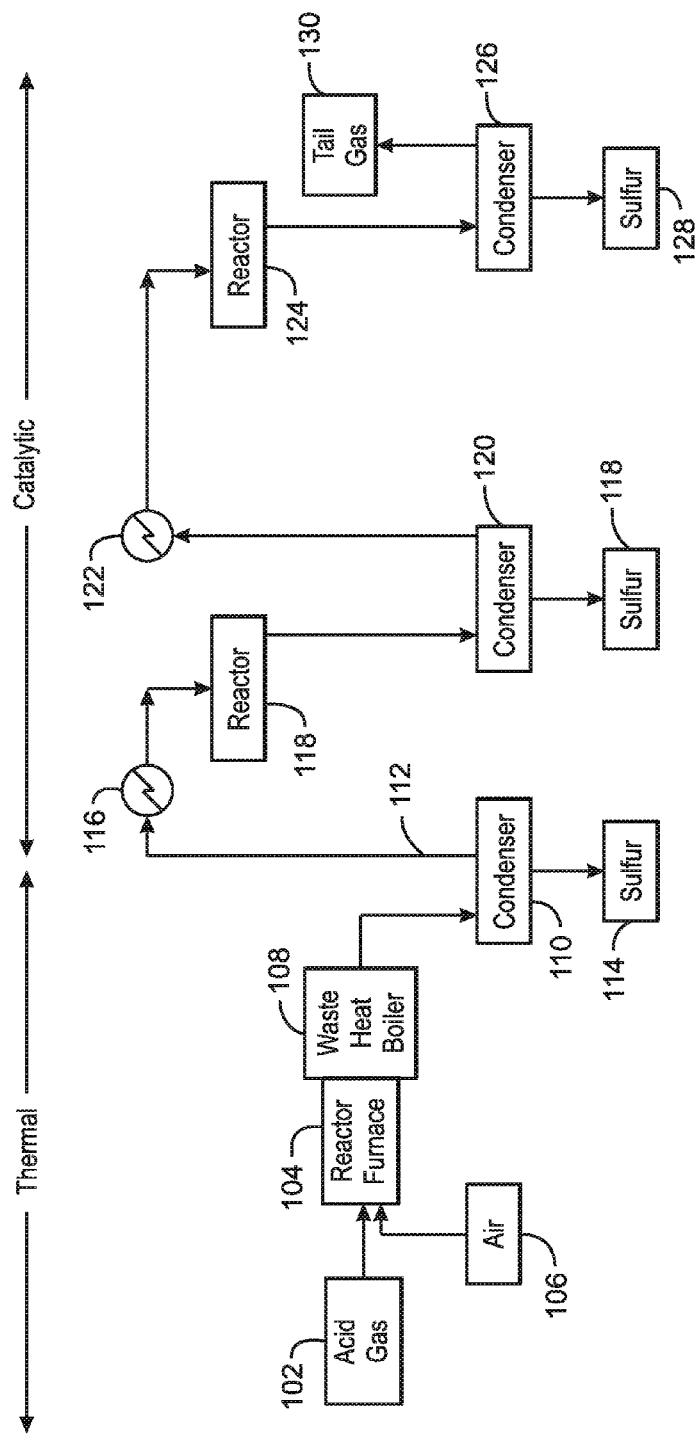
FIG. 1 is a block diagram of a conventional Claus Process.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

The term "acid gases" refers to contaminants that are often encountered in natural gas streams. Typically, these gases include carbon dioxide ($CO_2$) and hydrogen sulfide ($H_2S$), although any number of other contaminants may also form acids in aqueous solution. Acid gases are commonly removed by contacting the gas stream with an absorbent liquid, which may react with the acid gas. When the absorbent liquid becomes acid-gas "rich," a desorption step can be used to separate the acid gases from the absorbent liquid. The "lean" absorbent liquid is then typically recycled for further absorption.

A "bottoms stream" refers to a process stream withdrawn from the lower portion of a column or vessel.

A "cryogenic distillation process" refers to liquefying a gaseous mixture and separating its components in a distillation column. The liquefaction process is energy intensive and is therefore mainly suitable for applications with high concentrations of acid gases including $CO_2$ and $H_2S$. A cryogenic distillation process can be operated at extremely low temperatures and high pressures to separate out contaminants according to their different boiling temperatures. This process method is advantageous with respect to the direct production of liquid $CO_2$ or pure $CO_2$ gas streams subjected to higher pressures. The Controlled Freeze Zone (CFZ™) is a type of cryogenic distillation process, which deliberately freezes $CO_2$ out in a specially-designed distillation tower to generate an overhead purified natural gas stream and a bottoms liquid $CO_2$ stream.

The "Claus process" is a process that is sometimes used by the natural gas and refinery industries to recover elemental sulfur from hydrogen sulfide-containing gas streams. Briefly, the Claus process for producing elemental sulfur comprises two primary sections. The first section is a thermal section wherein $H_2S$ is converted to elemental sulfur at approximately 1,800-2,200° F.(1000-1220° C.). No catalyst is present in the thermal section. The second section is a catalytic section wherein elemental sulfur is produced at temperatures between 400° F. to 650° F. (200-340° C.) over a suitable catalyst (such as alumina). The reaction to produce elemental sulfur is an equilibrium-limited reaction; hence, there are several stages in the Claus process where separations are made in an effort to enhance the overall conversion of $H_2S$ to elemental sulfur. Each stage involves heating, reacting, cooling and separation.

The term "enhanced oil recovery" or "EOR" refers to processes for enhancing the recovery of hydrocarbons from subterranean reservoirs by the introduction of materials not naturally occurring in the reservoir.

The term "gas" may be used interchangeably with "vapor," and refers to a substance or mixture of substances in the gaseous state as distinguished from the liquid or solid state. Likewise, the term "liquid" means a substance or mixture of substances in the liquid state as distinguished from the gas or solid state.

The term "high pressure" refers to pressures that approach or exceed the critical pressure of water. Illustrative, non-exclusive examples of high pressures according to the present disclosure include pressures greater than 450 psig and above.

The term "natural gas" refers to the composition of natural gas that can vary significantly. As used in this disclosure, a natural gas stream contains methane (C1) as a major component. The natural gas will typically contain contaminants such as water, carbon dioxide, hydrogen sulfide, dirt, and iron sulfide; hydrocarbons such as ethane (C2), propane (C3), and higher hydrocarbons; and diluent gases such as nitrogen and helium.

An overhead stream" refers to a process stream withdrawn from the upper portion of a column or vessel.

The term "prilling" refers to generating any prill form of the materials or products produced by conventional prilling processes and equipment, including spray tower processes, freeze drying processes, etc. A prill is a small rounded pellet formed by prilling.

A "chemical solvent" refers to a liquid chemical that preferentially absorbs a selected component within a raw gas stream by means of a chemical reaction. Non-limiting examples include amines and aqueous solutions of potassium carbonate which may preferentially react with $H_2S$ or $CO_2$.

A "physical solvent" refers to a liquid chemical that preferentially absorbs a selected component within a raw gas stream by means of physical absorption of electron-rich compounds like $H_2S$ or $CO_2$. Non-limiting examples include methanol, propylene carbonate, and/or the dimethyl ethers of polyethylene glycol.

The term "tail gas" refers to an exit stream and/or an exhaust from a unit and/or device. The tail gas may be at any suitable temperature and/or pressure.

The tail gas may be injected into a subterranean reservoir, used in subsequent processing, used in subsequent pollution control devices, used in subsequent heat recovery, used in subsequent power recovery, and/or the like.

A "tail gas treatment unit" may include any suitable devices and/or equipment, such as a substoichiometric burner, a catalyst bed, an ammonia scrubber, a brine treatment device, an amine contactor, a wash column, a regeneration column, and/or the like. The tail gas treatment unit can reduce sulfur oxides to $H_2S$ for recycle into a Claus unit, convert sulfur oxides to elemental sulfur, and/or the like.

A "sulfur trap" refers to a device to provide separation of liquid sulfur from acid gas in a sulfur recovery process.

Overview

With the advent of cryogenic gas separation processes, acid gas is now available at much higher pressures, for example from about 500 psig to about 1000 psig. The high-pressure acid gas may allow for increased $CO_2$ recovery and easier injection of $CO_2$ for deep underground containment or enhanced oil recovery (EOR). However, at higher operating pressures, the reactions of the Claus process may be more exothermic than under normal operating conditions.

The typical catalytic reactors of the Claus process, discussed above, are not specifically designed to operate under the increased heat generated at elevated pressures. During the catalytic stage, the typical Claus process is designed to operate at a low pressure, 1 to 15 psig, and at moderate temperatures. The operating temperature of the catalytic reactors may typically be 240° C. for the second reactor and 200° C. for the third reactor and can become progressively lower as additional reactors are placed in series. This can lead to decreased reaction rates during the reaction between $H_2S$ and $SO_2$ over a length of time. Hence, a bed of catalyst, normally centered at the horizontal center line of the reactor, may be implemented within the Claus reactors to increase the rate of reaction. The most widely used Claus reaction catalyst is porous aluminum oxide ($Al_2O_3$), commonly referred to as alumina.

However, if a high-pressure acid gas is introduced into the typical Claus process, difficulties may arise in managing the exotherm of the reaction generated by the high pressures since typical Claus reactors may not be able to contain the higher than normal processing temperatures. Therefore, the aforementioned reactors and other conventional parameters of the Claus process may not be able to process the high-pressure acid gases, thereby, leading to a decrease in the volume of generated elemental $S_x$. Additionally, the conventional Claus process may introduce nitrogen into the process causing detrimental effects upon the quality of the $CO_2$ coming from the tail gas. The contamination of $CO_2$, coupled with an overall low-pressure process, may cause difficulties in the recovery of $CO_2$.

The present techniques provide for the generation of elemental $S_x$ from a high-pressure acid gas stream. More specifically, in various embodiments, a modified or high-pressure Claus process combined with a cryogenic distillation process provides a method and systems to generate elemental sulfur from a high-pressure acid feed gas using shell-and-tube reactors at elevated reaction temperatures. Furthermore, in various embodiments, separated high-pressure $CO_2$ may be safely recovered for safe disposal or for EOR in sour reservoirs.

While the catalyst of the typical Claus process may enhance the performance of the Claus reaction, it is not well suited to deal with elevated temperatures generated during the conversion of the $H_2S$ concentration in a high-pressure acid gas to elemental S. The shell-and-tube reactors of the proposed high-pressure Claus process may be capable of removing the excess heat generated during the reaction of the $H_2S$ with $SO_2$ to generate elemental $S_x$. The shell-and-tube reactors of the proposed high-pressure Claus process provide a comparatively large ratio of heat transfer area with little to no constraints on the volume of $S_x$ that may be produced. Therefore, one of the objectives for implementing the shell-and-tube type reactor, in place of the catalyst bed reactor of the typical Claus process, may include effectively removing excess heat of reaction that may be generated during the conversion of $H_2S$ to produce an increased volume of elemental S. Additionally, the shell-and-tube reactors may provide for a more efficient mechanism for recovering higher-purity $CO_2$ for later commercial use.

Figure 2:
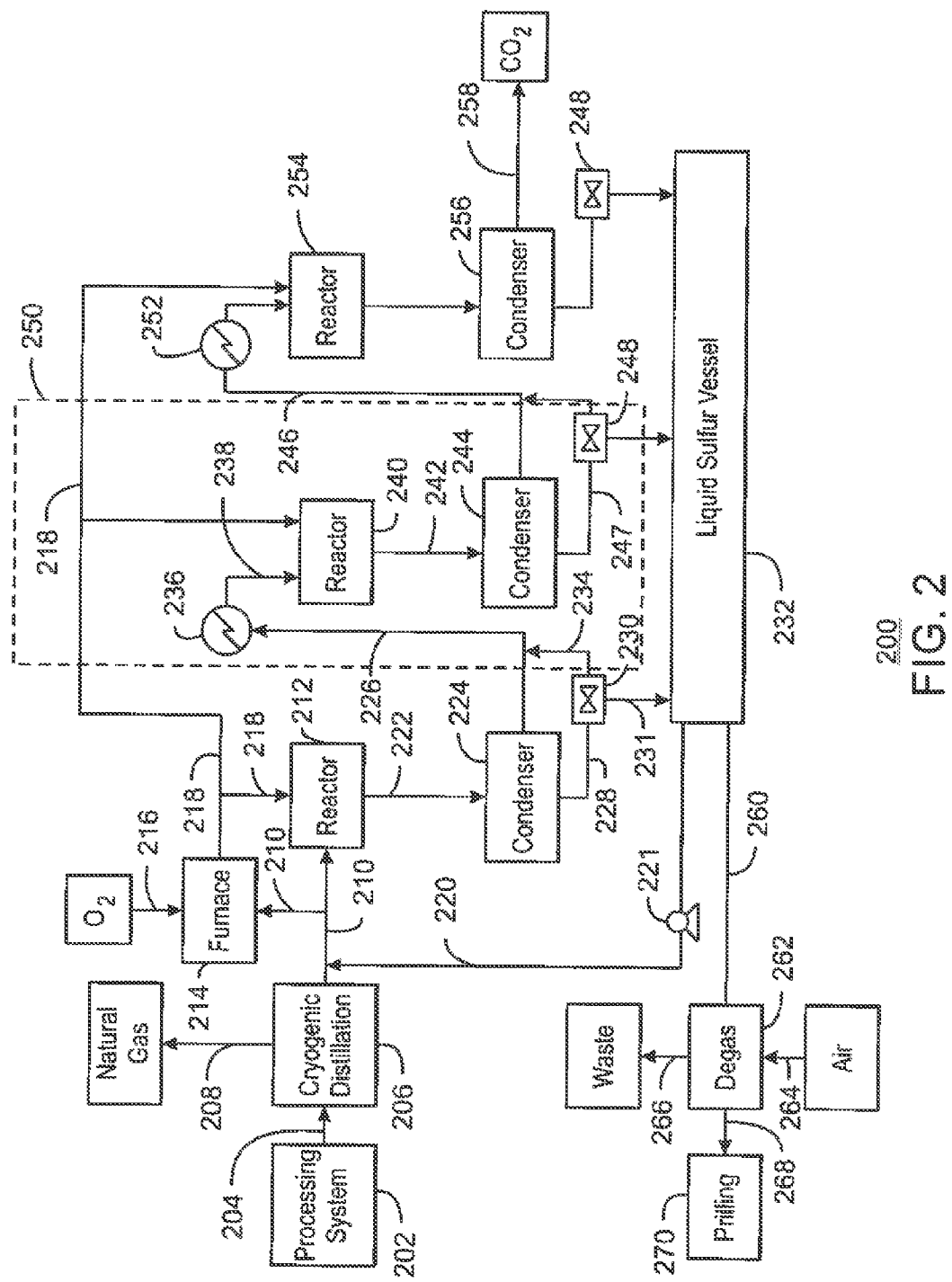
FIG. 2 is a block diagram of a high-pressure Claus Process including shell-and-tube reactors.

FIG. 2 is an illustration of a high-pressure Claus process 200 including shell-and-tube reactors. As shown in FIG. 2, a raw acid gas can be processed in a gas processing system 202. The gas processing system 202 may remove a portion of the acid gases, water, heavier hydrocarbons (such as ethane, ethylene, and higher carbon compounds), and other impurities. A processed sour gas stream 204 may flow to a cryogenic distillation column to generate a natural gas stream 208, such as methane ($CH_4$) and a liquefied acid gas stream 210, including $H_2S$ and $CO_2$. The stream of liquefied acid gas 210 may be split and directed to a reactor 212 and to a reaction furnace 214. Specifically, the liquefied acid gas stream 210 may be burned in the reaction furnace 214 using a steady supply of $O_2$ 216. A burned acid gas stream 218 may be used to produce the desired 2 to 1 stoichiometric ratio of $H_2S$ to $SO_2$ as shown in the aforementioned equation (3). Equation (3) includes the oxidation of $H_2S$ to generate an oxidizing agent, $SO_2$, which may be used in subsequent reactions in the catalytic stages.

Both the liquefied acid gas stream 210 from the cryogenic distillation column 206, which may contain unreacted $H_2S$ and $CO_2$, and the burned acid gas stream 218, containing $SO_2$ and $CO_2$, and may flow to the reactor 212 and to other reactors within the high-pressure Claus process. In various embodiments, a flashed stream of $H_2S$, $CO_2$, and $SO_2$ 220 can be combined with the liquefied acid gas stream 210 before injection into the reactor 212. A pump 221 may be utilized to increase the pressure of the flashed stream 220 for ease of injection into the reactor 212.

In the reactor 212, the unreacted $H_2S$ of the liquefied acid gas stream 210 may be reacted to form $S_x$ vapor. This reaction takes place between the oxidizing agent, $SO_2$, and the $H_2S$. A gaseous stream 222 including the $S_x$ vapor, along with $CO_2$ and $SO_2$ and other residuals, may exit reactor 212 to be cooled and condensed in a condenser 224 to produce an overhead acid gas stream 226, which may contain unconverted $H_2S$, along with $CO_2$, and $SO_2$. Also within the condenser 224, a liquid $S_x$ stream 228 can be separated from the acid gas stream 226 and flowed into a sulfur trap 230. A liquid $S_x$ stream 231 leaving the sulfur trap 230 may then flow to a liquid sulfur vessel 232, such as an aboveground storage drum, storage tank or collection drum, or an underground molten sulfur pit. In various embodiments, vaporized acid gases 234 formed in a headspace of the sulfur trap 230, including trace amounts of gaseous $S_x$, can be injected into the acid gas stream 226 for additional processing.

The acid gas stream 226 can be passed through a series of catalytic conversion stages that can include reheating, conversion, and cooling/condensing. In a first stage of the catalytic conversion of $H_2S$ to $S_x$, the acid gas stream 226 may pass through reheater 236. The reheating of the acid gas stream 226 may prevent the condensation of $S_x$ by keeping the reheat temperature above the $S_x$ dew point. A heated acid gas stream 238 may then enter a catalytic reactor 240. Using a shell-and-tube design, the heated acid gas stream 238 may flow through a tube side of the reactor 240. Within the tube side, the direct oxidation of $H_2S$ may occur to generate a gaseous stream 242 of $S_x$, water vapor, unreactive $CO_2$, unreacted $SO_2$, and other residual gases. A cooling heat transfer medium may flow through the shell side of the reactor 240 to absorb excess heat generated during the conversion reaction on the tube side. In some embodiments, the cooling fluid can be liquid water which may absorb the excess heat of reaction generated during the processing of the partially-reacted acid gas stream 238. With the elevated temperatures caused by the exothermic conversion reaction, the shell-and-tube design of the reactor 240 may provide a solution for processing acid gas streams under a high pressure and high temperature. The gaseous stream 242 generated from reactor 240 may be cooled and at least partially condensed within a condenser 244 to produce a gaseous stream 246 including $S_x$, $CO_2$, $H_2O$, and $SO_2$. The condenser 244 may separate a stream of liquid $S_x$ 247 from the gaseous fluid 246 after each successive condenser. The liquid $S_x$ stream 247 may be directed to a sulfur trap 248 and thereafter into the liquid sulfur vessel 232.

The cycle of gas reheating, reacting, and condensing, as shown by the dotted line 250 that encircles the first catalytic stage in FIG. 2 can be repeated in numerous catalytic stages. For example, the gaseous stream 246 may flow to successive catalytic stages in the high-pressure Claus process for subsequent processing. Successive reheaters including 252, reactors including 254, and condensers including 256, may perform similar functions as their predecessors but with varied concentrations. Accordingly, the overall conversion of $H_2S$ to $S_x$ may be improved each time a cycle of a particular stage is performed. The catalytic stages may be repeated as many times as desired. However, a minimum of three catalytic conversion stages may be considered optimum to achieve satisfactory conversion.

After leaving the last condenser 256, a tail gas stream 258 may contain an appreciable amount of $CO_2$. The $CO_2$ of the tail gas stream 258 may be compressed and cooled to recover about 50% to about 90% $CO_2$ from the initial acid gas stream 210. The $CO_2$ rich tail gas 258 may remain at a high-pressure and later provided for EOR, disposal, or both.

A molten liquid $S_x$ stream 260 containing trace amounts of gaseous $H_2S$, $CO_2$, and $SO_2$ may be routed from the liquid sulfur vessel 232 and directed into a degassing facility 262 to remove the trace components using an injected air stream 264. A trace gas stream 266 may be vented and sent to waste for disposal, or may be incinerated. The degassing process may produce a liquid $S_x$ stream 268 with a $H_2S$ concentration of about 300 parts per million by weight (ppmw) or less. The liquid $S_x$ stream 268 may be sent to a prilling process facility 270 for solidification. By solidifying the liquid $S_x$, $S_x$ prills may be formed to facilitate ease in handling and storage.

Figure 3:
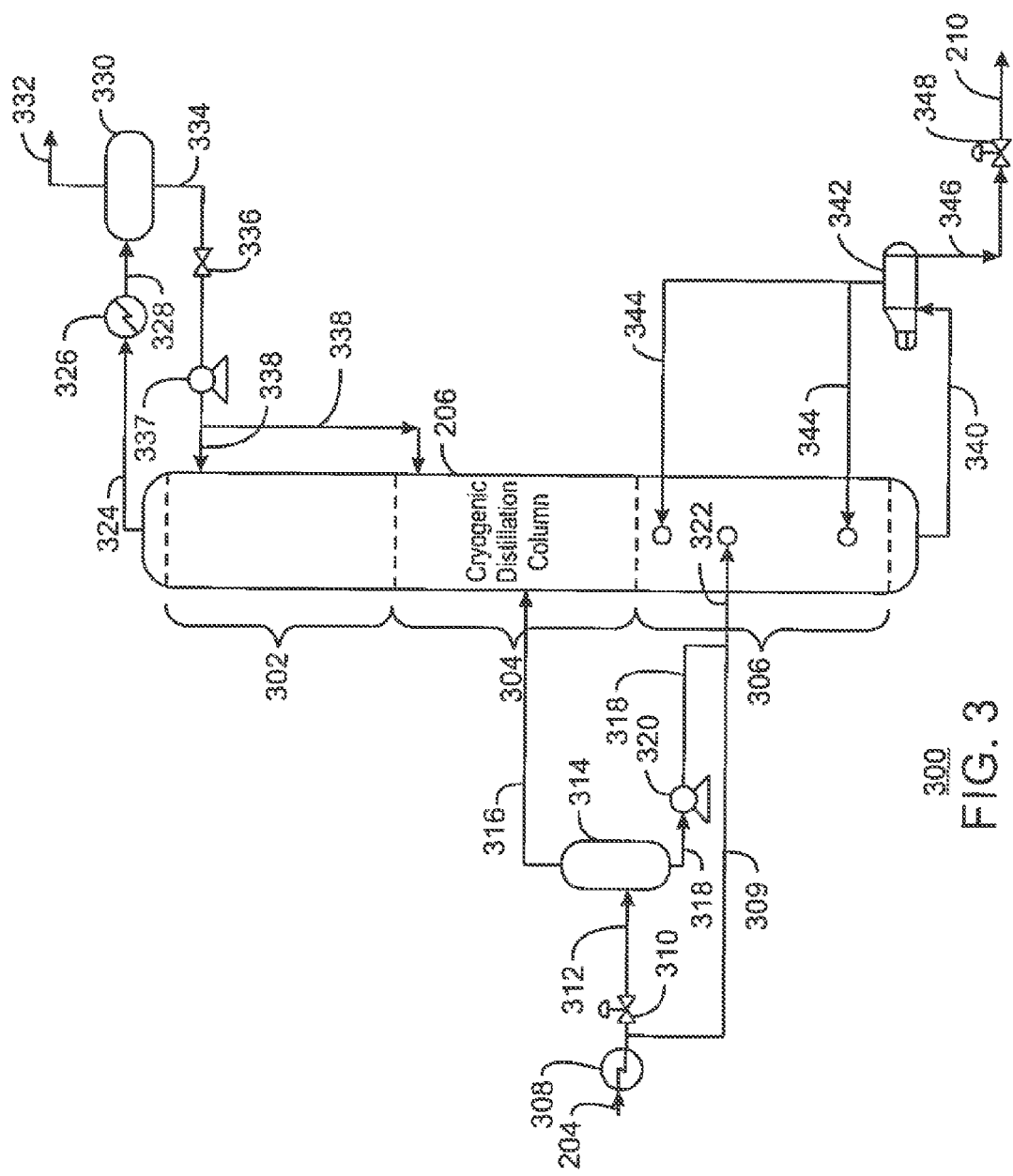
FIG. 3 is a block diagram of a cryogenic distillation tower of the high-pressure Claus Process.

FIG. 3 illustrates a detailed view of a cryogenic distillation tower 300 that may be used upstream of the high-pressure Claus process. Like-numbered items are as discussed with respect to FIG. 2. Cryogenic gas processing is a distillation process sometimes used for gas separation. The cryogenic gas processing may avoid the use of solvents, minimize acid gas removal equipment, and may generate a liquefied, concentrated sour acid gas stream primarily of $CO_2$ and $H_2S$. However, challenges exist with respect to cryogenic distillation of such sour acid gases. For instance, when $CO_2$ is present in raw gas at concentrations greater than about 5%, the $CO_2$ may freeze out as a solid in a standard cryogenic distillation unit and render the standard process inoperable. To circumvent this issue, the cryogenic distillation column 206 may be implemented to deliberately capture and liquefy the solid $CO_2$ particles. As a result, a clean $CH_4$ stream, along with any nitrogen present in the raw gas, may be generated overhead, while a liquid $CO_2/H_2S$ stream may be generated as a bottoms stream at relatively high pressures, such as pressures higher than about 500 psig. The cryogenic distillation column 206 may be divided into three primary sections. These sections include an upper distillation zone, or "rectification section" 302, an intermediate controlled freezing zone, or "spray section" 304, and a lower distillation zone, or "stripping section" 306. In some embodiments, a specially-designed distillation column, including a controlled freeze zone (CFZ™) column that is suitable for applications with high concentrations of acid gases, can be implemented upstream of the high-pressure Claus process to liquefy $CO_2$ and adequately separate components within the processed sour gas stream 204.

As shown in FIG. 3, the processed sour gas 204 may be cooled in a heat exchanger 308. The cooled sour gas 309 can be split into two separate streams. One of the cooled sour gas streams 309 may directly enter the column 206 in the stripping section 306 and the other cooled sour gas stream 309 may flow to an expansion valve 310 to provide additional cooling. A Joule-Thompson valve may be the preferred device with gas streams that are prone to forming solids, as in the case of $CO_2$. A chilled acid gas stream 312 may exit the expansion valve 310 and may flow directly into a separation vessel 314 in the event that liquid, and potentially solids are present due to low inlet temperatures. The separation vessel 314 can be a two-phase separator in order to minimize the possibility of solids plugging liquid inlet lines and other internal components of column 206. An overhead gas vapor 316 may leave the separation vessel 314 and enter the spray section 304 of the column 206. A bottom acid gas liquid stream 318 may be discharged from the bottom of the separation vessel 314 in the form of a liquid/solid slurry. The bottom acid gas liquid stream 318 can be pressurized with an optional pump 320, and can be combined with the cooled sour gas stream 309, to form a combined acid gas stream 322 that can be fed into the stripping section 306.

Within the stripping section 306, $CH_4$ vapor included in the combined acid gas stream 322 may be stripped and proceed upward into the spray section 304. The $CH_4$ vapor continues to move upward into the rectification section 302, along with other light gases, and eventually separates and flows through a top outlet of the column 206. The $CH_4$ vapor may exit the column 206 as an overhead stream 324. The overhead stream 324 may be chilled by an external refrigeration unit that may include a heat exchanger 326. A refrigerated hydrocarbon stream 328 may then flow to a reflux vessel 330 to separate a gas phase from a liquid phase. A gas stream 332 may include a lighter hydrocarbon gas, primarily $CH_4$, which may be sold for commercial use. A liquid stream 334 may be considered as a liquid reflux that may also include $CH_4$, with traces of $H_2S$ and $CO_2$. The liquid stream 334 may be cooled by an expansion valve 336 and then pressurized by pump 337 to force a cold liquid $CH_4$ 338 into the top of rectification section 302, or into the spray section 304 as a cold spray.

A portion of the aforementioned $CH_4$ vapor from gas stream 322 that proceeded upward through the column 206 may be met with a spray of the cold liquid $CH_4$ 338. With a lower temperature and high concentration, the $CO_2$ and $H_2S$ within the $CH_4$ vapor may remain in liquid form and travel back into the stripping section 306 to form a bottoms acid gas stream 340. The bottoms liquid acid gas stream 340 may flow into a reboiler 342 where a reboiler stream 344 can be introduced into the upper portion or the lower portion of the stripping section 306. Additionally, a bottom reboiled liquid acid gas stream 346 may exit the reboiler 342 and flow through an expander valve 348 in order to reduce the pressure and to chill the reboiled acid gas stream 346. The reboiled stream 346, after passing through the expander valve 348 may be used to provide cooling in other parts of the process.

Figure 4:
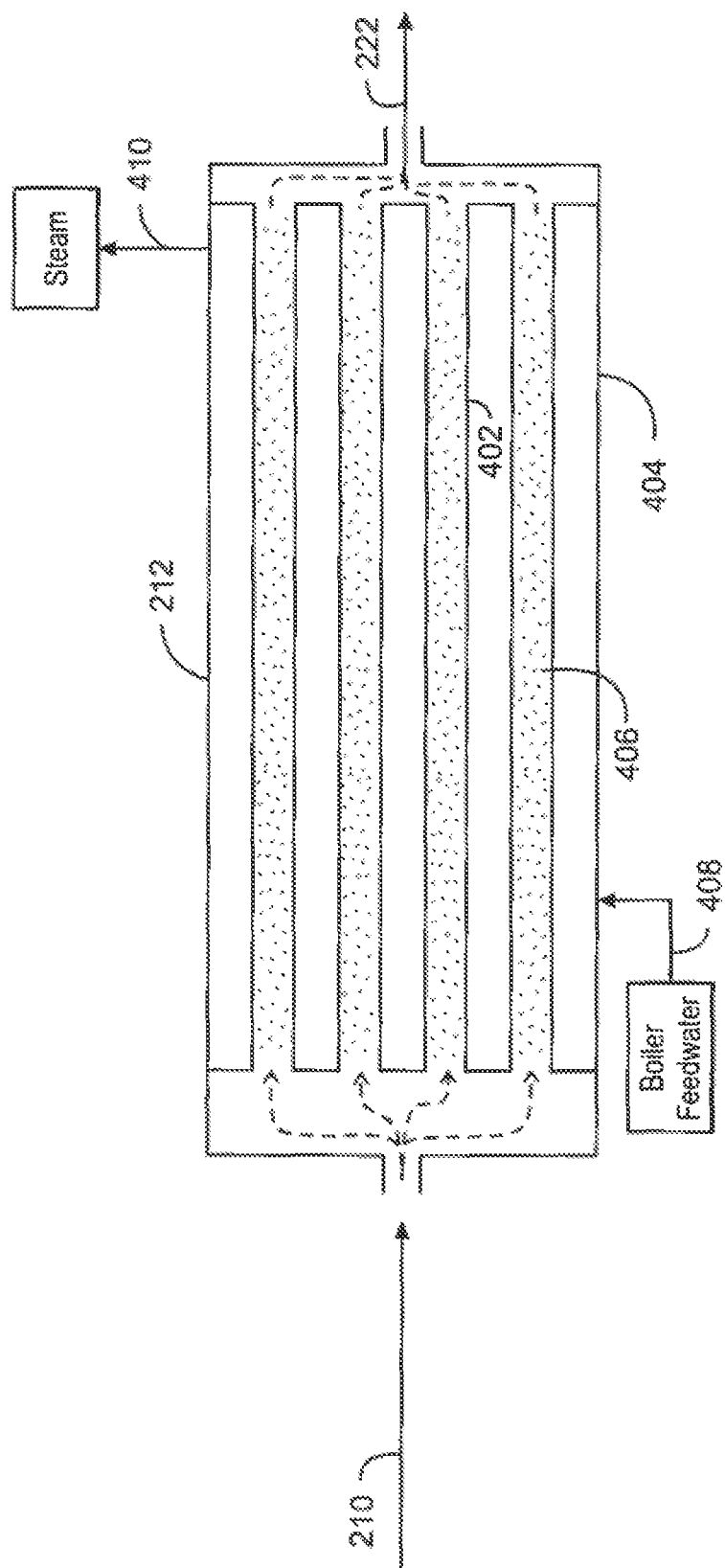
FIG. 4 is a block diagram of a shell-and-tube reactor of the high-pressure Claus Process.

FIG. 4 illustrates a detailed view 400 of the shell-and-tube reactor 212 of the high-pressure Claus process. Like numbered items are as discussed with respect to FIG. 2. Unlike the shell-and-tube reactor 212, the typical catalytic reactor of the Claus process does not provide a mechanism to effectively remove excessive generated heat at higher operating pressures. Within the reaction chamber of the standard Claus process, heat is carried out of the reactor with the partially-reacted gases in order to remove energy generated by the $H_2S$ oxidation reaction. In the catalyst bed, the conventional Claus reactor operates at lower temperatures. Thus, the effluent gas alone is not sufficient for the removal of excessive heat generated at elevated pressures. As shown in FIG. 4, the shell-and-tube reactor 212 is a type of reactor that may be used to efficiently remove excess heat produced during a reaction by transferring it to a cooling medium on the shell side of the reactor. The design of the reactor 212 typically includes a plurality of reaction tubes 402 held within a shell 404. The liquefied acid feed gas stream 210 from the cryogenic distillation column 206, which enters the tubes 402, may include a concentration primarily of $H_2S$ and $CO_2$. The unreacted $H_2S$ may react, in the presence of an oxidizing agent such as $SO_2$, to generate $S_x$. The chemical reaction between $H_2S$ and the oxidizing agent takes place within the plurality of reaction tubes 402. It should be noted that the reactor design may be similar for both the waste heat boiler after the thermal stage and the catalytic stages. Furthermore, a catalyst 406 may fill the tubes 402 in an effort to accelerate the rate of reaction. The catalyst may aid in the conversion of $H_2S$ in the catalytic stage to generate $S_x$, including within the gaseous stream 222, which exits the reactor 212.

With the use of the high-pressure acid gas 210, the temperature of the chemical reactions within the reactor 404 may be elevated to the point where additional dissipation of the generated heat is needed to prevent runaway reactions. A heat transfer coolant 408, such as boiler feedwater, may circulate through the shell side 404 of the reactor 212 and across and along the plurality of tubes 402. The heat generated during the reaction within the tubes 402 may be transferred to the heat transfer coolant 408. The use of the heat transfer coolant 408 may allow the chemical reactions to occur under controlled thermal conditions by continuously removing excess heat. Depending on the reaction temperatures, the heat transfer coolant 408 may be boiled to produce a low-pressure steam 410. The use of the cooling water is critical in reducing hot spot formation and, more importantly, in preventing the temperature of the reactor 212 from increasing at uncontrollable rates, possibly leading to catastrophic process failures. In various embodiments to increase heat transfer efficiency, further modifications to the flow paths of the outer and inner fluids of the reactor 212 may be accomplished by adding baffles to the shell side 404 to increase fluid contact with the tube side 402.

Figure 5:
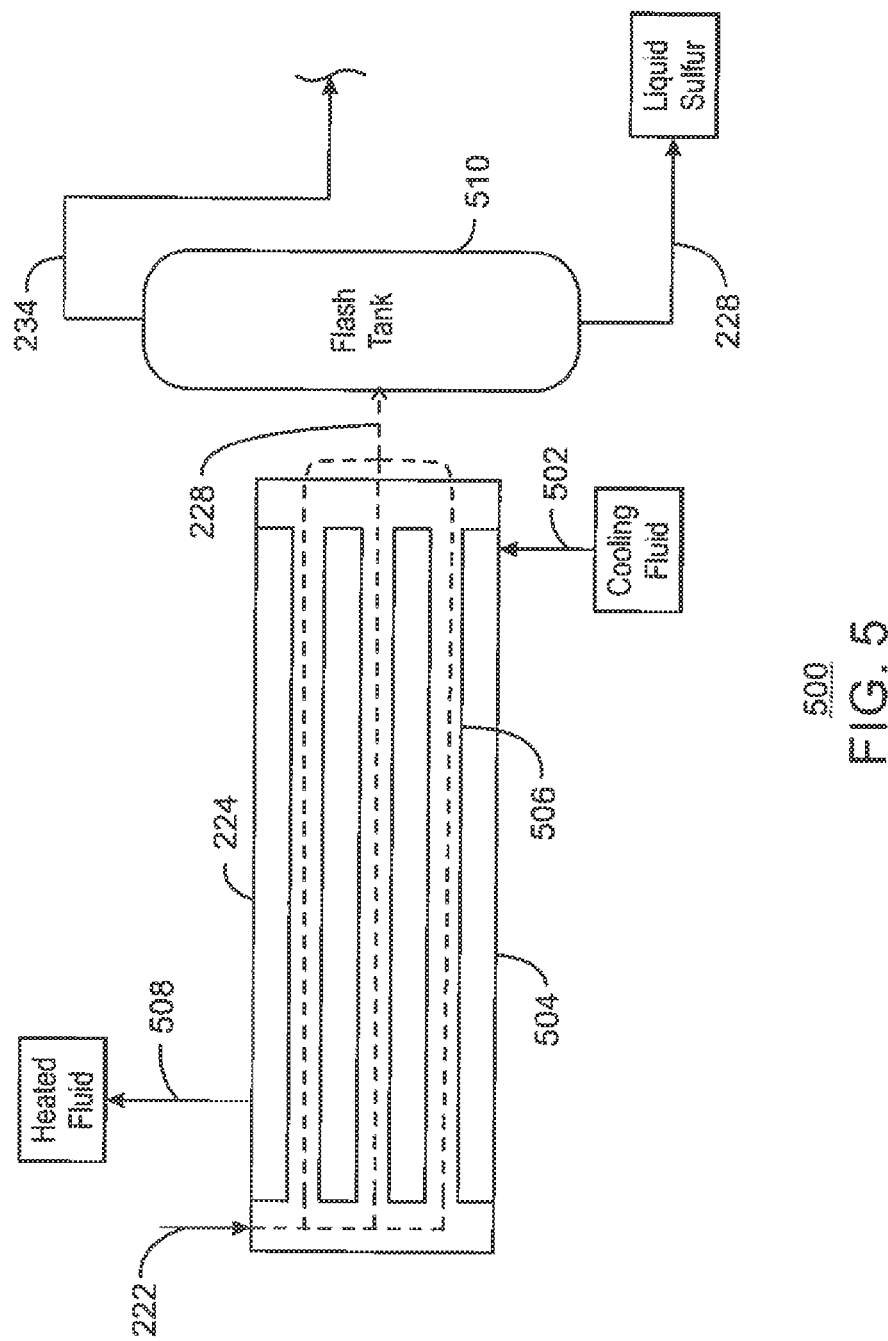
FIG. 5 is a block diagram of a condenser of the high-pressure Claus Process.

FIG. 5 is an illustration of a detailed view of a condenser 500 used in the high-pressure Claus process. Like numbered items are as discussed with respect to FIG. 2. The gaseous stream 222 that leaves the reactor 212 may include $S_x$ and $CO_2$ with unreacted $H_2S$ and trace amounts of unreacted oxidizing agent. The gaseous stream 222 may flow into the condenser 224. The primary function of the condenser 224 may include cooling and condensing the vaporized $S_x$ within the gaseous stream 222 in order to produce a stream 228 that includes the liquid $S_x$. The condenser 224 of the high pressure Claus process can be a typical shell-and-tube condenser where condensation of $S_x$ typically takes place on the tube side.

A cooling fluid stream 502, such as boiler feed water, may be fed into a shell side 504 of the condenser 224. The gaseous stream 222 may enter the condenser 224 on the tube side 506 at an elevated temperature. As the gaseous stream 222 passes through a plurality of tubes 506, its elevated temperature may be lowered as the cooling fluid 502 absorbs heat from the gaseous stream, thereby, generating a heated fluid or vapor 508, which exits the condenser 224 on the shell side 504. As a result, the temperature of the gaseous stream 222 may be lowered to cause condensation within the tubes 506 to produce the liquid $S_x$ stream 228.

Since the liquid $S_x$ stream 228 may include $H_2S$ and other residual gas, a flash tank separator 510 may be implemented to separate the liquid $S_x$ 228 from the other products. The flash tank separator 510 may reduce the pressure of the liquid $S_x$ stream 228 thereby allowing any remaining acid gases in stream 228 to be vaporized overhead. A vaporized acid gas stream 234 may be directed overhead and the separated liquid stream $S_x$ 228 exits as a bottom stream for further processing.

Figure 6:
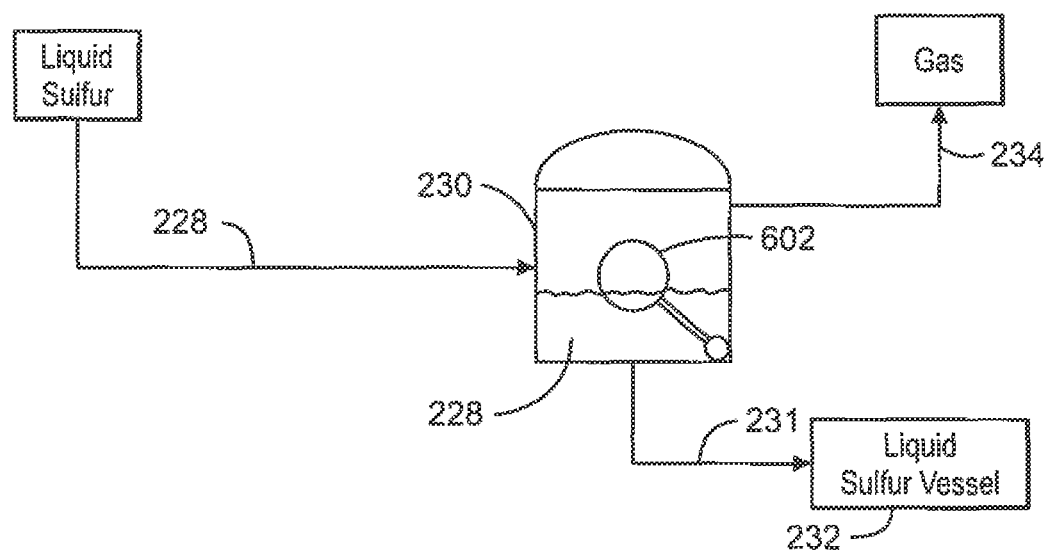
FIG. 6 is a block diagram of a sulfur trap of the high-pressure Claus Process.

FIG. 6 is an illustration of a detailed view of a sulfur trap 600 that may be used in the high-pressure Claus process. Like numbered items are as discussed with respect to FIG. 2. The stream of liquid $S_x$ 228 may flow to the sulfur trap 230. Environmentally unacceptable residual process acid gases, such as $H_2S$, mercaptans, and $CS_2$, may exist within the liquid $S_x$ stream 228. The sulfur trap 230 provides for the separation and removal of bubbles of such residual acid gases from the liquid $S_x$ 228.

The liquid $S_x$ stream 228 enters the sulfur trap 230 and as the volume of liquid $S_x$ 228 accumulates, a spherical float 602 is displaced upwardly from its initial resting position. The spherical float 602 may be constructed of material such that its average density allows flotation within the liquid $S_x$ 228. The displacement of the spherical float 602 may allow for a stream of liquid $S_x$ 231, free of bubbles of residual acid gases 234, to flow from a bottom outlet of the sulfur trap 230. The residual acid gases 234, located in an overhead space of the sulfur trap 230, are removed and can be continually recycled back into various catalytic conversion stages. The liquid $S_x$ stream 231 may then flow from the sulfur trap 230 into the liquid sulfur vessel 232 for further processing and storage. The emptying of the liquid $S_x$ 228 from the sulfur trap 230 may continue until the spherical float 602 returns to its initial resting position. In some embodiments, a liquid seal (not shown) may be maintained during the emptying of the sulfur trap 230 in order to prevent vaporized acid gases 234 from escaping along with the liquid $S_x$ stream 231 into the liquid sulfur vessel 232 and possibly into the atmosphere.

Figure 7:
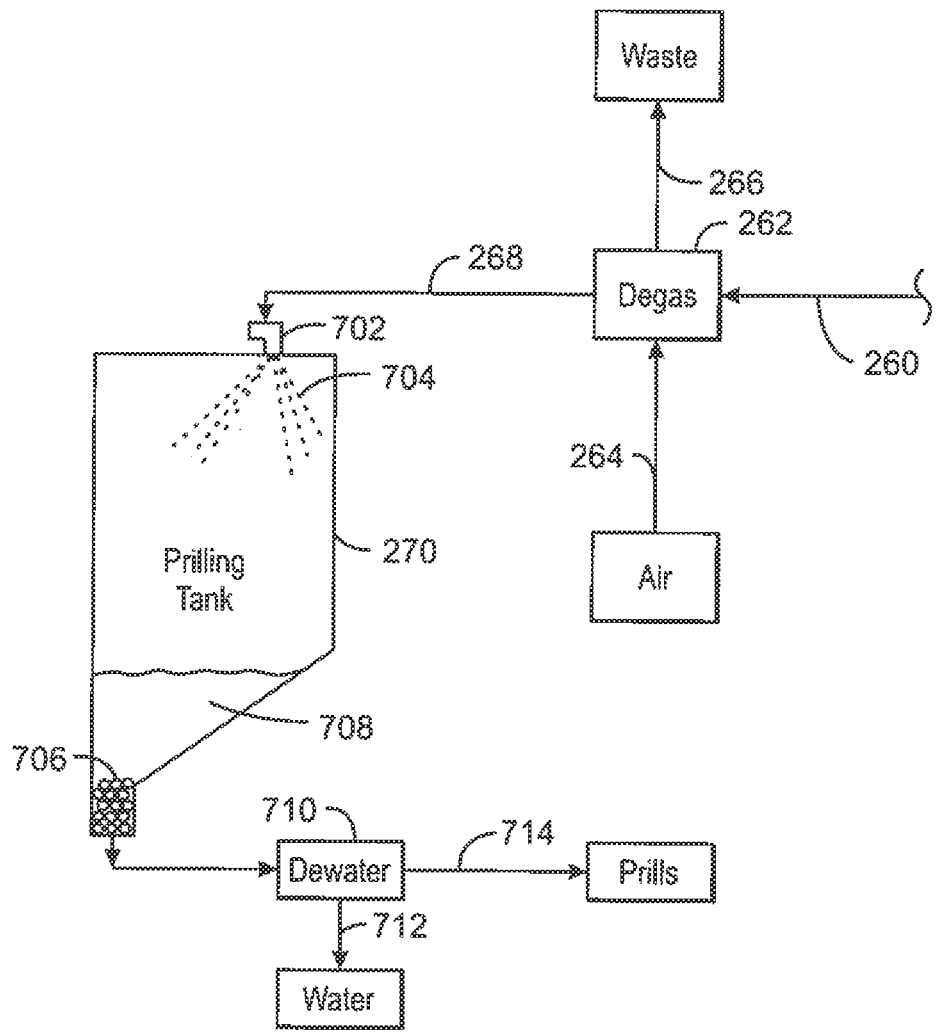
FIG. 7 is a block diagram of a degassing process for the high-pressure Claus Process.

FIG. 7 is an illustration of a detailed view of a degassing process 700 of the high-pressure Claus process. Like numbered items are as discussed with respect to FIG. 2. Elemental liquid $S_x$ 260 from the liquid sulfur vessel 232 may contain physically dissolved $H_2S$ and chemically bound $H_2S$ in the form of hydrogen sulfanes, $H_2S_x$. Therefore, a primary purpose of the degassing process may be to remove the $H_2S$ and $H_2S_x$ from the liquid $S_x$ 260, thereby eliminating potential hazards that may be associated with the handling, transporting, and storing of the sulfur.

The elemental liquid $S_x$ 260 may flow into a degassing facility 262 and undergo agitation through the use of a bubbling hot air stream 264, which facilitates $H_2S$ removal as a stripping gas stream. Air may be a suitable stripping gas stream since oxygen present in the air serves as an oxidizing agent to further react excess $H_2S$ in the elemental liquid $S_x$ 260. The air also acts as an agitation medium and helps to maintain the $H_2S$ below a lower explosive limit. After completion of sufficient agitation, the air stream 264 may be removed and discharged for disposal through a waste stream 266.

A degassed elemental liquid $S_x$ stream 268, stripped of $H_2S$ and $H_2S_x$, may then be directed to a prilling tank 270 in order to solidify the elemental liquid $S_x$ 268. A nozzle 702 may provide a continuous spray of elemental liquid $S_x$ 268 into liquid droplets of $S_x$ 704 within the prilling tank 270. The droplets of the liquid elemental $S_x$ 704 can be cooled in the prilling tank to form spherical, uniformly sized $S_8$ prills 706.

Within the bottom portion of the prilling tank 270, an agitated cooling liquid 708, such as water, may be maintained. The $S_8$ prills 706 may come into direct contact with the cooling liquid 708 to allow the $S_8$ prills 706 to thoroughly harden and solidify.

The bottom of the prilling tank 270 may be sloped to allow the $S_8$ prills 706 to settle to the bottom of the prilling tank 270. The $S_8$ prills 706 and the cooling liquid 708 may flow by gravity toward a dewatering screen 710. Through the implementation of the dewatering screen 710, the $S_8$ prills 706 and cooling liquid 708 may be separated. A cooling liquid stream 712 may be recycled or sent to disposal and a substantially moisture-free solid $S_8$ prills stream 714 may be processed for handling and storage. The stream of $S_8$ prills 714 may provide a neat and simple form for handling and transportation of sulfur. For maximum commercial value, the produced $S_8$ prills should be generally spherical in shape, uniform in size and density, and have low moisture content.

Figure 8:
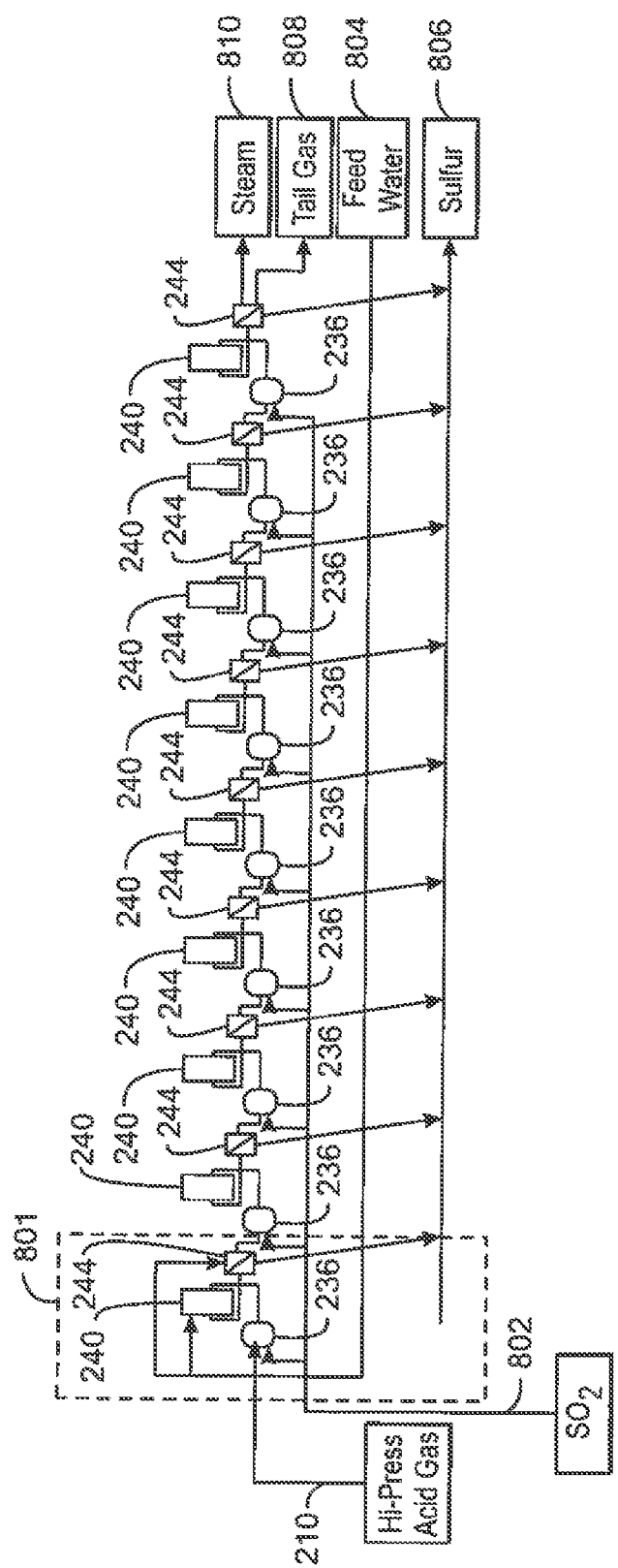
FIG. 8 is a block diagram of a sequence of catalytic conversion cycles of the high-pressure Claus Process.

FIG. 8 is an illustration of a series of cycles 800 including reheating, reacting, and condensing where each individual cycle can embody a single catalytic stage as shown by the dotted line 801. Like numbered items are as discussed with respect to FIG. 2. As shown in FIG. 8, several catalytic stages can sufficiently achieve an effective conversion of $H_2S$ to produce elemental $S_x$ as a final product. Each catalytic stage can include a cycle using a reheater 236, a reactor 240, and a condenser 244, respectively. However, as the stages progress, the concentrations of reactants and products may change based on the particular rate of reaction taking place.

A stream of high-pressure acid gas 210 and a $SO_2$ stream 802 may be directly injected into the reheaters 236. In some embodiments, a hot-gas bypass, a gas-to-gas exchanger, or a direct-fire heater may be used as a method of reheating the acid gas stream 210. Further, a portion of $H_2S$ within the acid gas stream 210 may be partially combusted within direct-fire reheaters 236 to readily form additional $SO_2$. A portion of $H_2S$ gas may react with the generated $SO_2$, to produce a small quantity of gaseous, elemental $S_x$, within the reheaters 236. However, the actual conversion reaction of $H_2S$ to generate the bulk of the elemental $S_x$ may take place in the reactors 240. As previously discussed, the reactors 240 may be shell-and-tube type reactors used to produce a gaseous stream of elemental $S_x$, along with unreacted $H_2S$ and $SO_2$, and other residuals including $CO_2$ and $H_2$, on the tube side. Additionally, a stream of boiler feed water 804 may also be introduced into the reactors 240 as a method of removing additional heat created during the conversion reaction.

To increase the rate of reaction, the reactors 240 may contain a bed of catalyst. The catalyst, such as titania or alumina, may also hydrolyze by-products, including carbonyl sulfide (COS) and carbon disulfide ($CS_2$), that may be present. Since the required bed operating temperature in the individual catalytic stages may be achieved by heating the acid gas stream 210 until the desired temperature is reached, the reheaters 236 may also aid in preventing sulfur condensation in the catalyst bed of the reactor 240.

A gaseous acid gas stream leaving the reactors 240 may then be directed to condensers 244. A stream of boiler feed water 804 may also be introduced into the condensers 244 as a method for cooling, condensing, and separating elemental $S_x$ 806 out of the partially-reacted acid gas stream 210. The separated liquid elemental $S_x$ 806 exits the condensers 244 and may be further processed for storage and commercial use, as described herein.

The unreacted acid gas stream from the initial condenser may be continually recycled at varied concentrations through successive cycles of the catalytic stages. The remaining acid gas stream may be separated from the last condenser 244 in the final catalytic stage. This acid gas, also referred to as tail gas 808, may be disposed or burned, or processed further to recovery additional sulfur. However, it may be desirable to recover $CO_2$ from the tail gas 808, which may be recycled to a hydrocarbon reservoir for EOR. The boiler feed water 804 initially fed to the reactors 240 and to the condensers 244 may exit in the form of steam 810.

Figure 9:
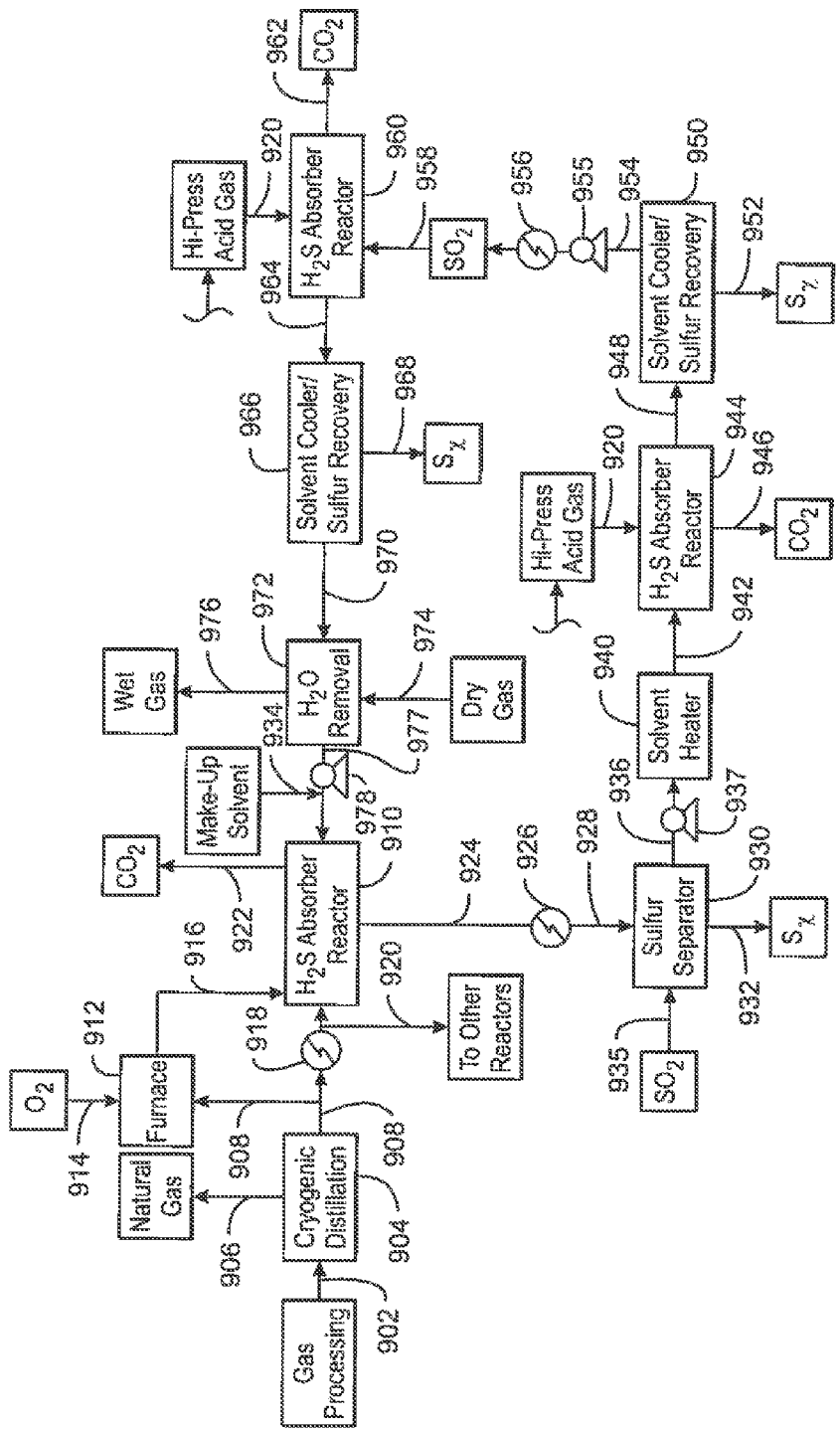
FIG. 9 is a block diagram of a second embodiment of the high-pressure Claus Process including the injection of separately generated $SO_2$ and multiple solvent cooler/sulfur recovery units.

FIG. 9 is an illustration of a second embodiment of the high-pressure Claus process including the injection of a separately generated $SO_2$ stream and multiple solvent cooler/sulfur recovery units. With the excessive heat of reaction generated during the processing of high-pressure acid feed gases, the injection of separately generated $SO_2$ may also provide a means for controlling and avoiding excessive heat in combination with the shell-and-tube reactors of the high-pressure Claus process.

In FIG. 9, a sour gas may be processed in a gas processing system 900 to produce a processed sour gas stream 902. The processed sour gas 902 may be fed to a cryogenic distillation column 904 to generate an overhead stream of natural gas 906 and a liquid acid gas stream 908 that may include $H_2S$ and $CO_2$ The liquid acid gas stream 908 may split into two separate streams where one of the streams may be directed to a $H_2S$ absorber reactor 910 and the other acid gas stream to a furnace 912.

The liquid acid gas stream 908 directed to the furnace 912 may be burned in the furnace 912, using a steady supply of $O_2$ 914, to produce a gaseous stream 916 that may include $SO_2$, $CO_2$, and other residual gases. The liquid acid gas stream 908 that flows directly to the $H_2S$ absorber reactor 910 may be pre-heated to a particular temperature in a heater 918 to produce a heated acid gas stream 920 directed into the $H_2S$ absorber reactor 910 and to several other $H_2S$ absorber reactors within the process loop. Within the $H_2S$ absorber reactor 910, the $CO_2$ may not be removed from the heated acid gas stream 920. It may than be compressed to a higher pressure to produce a high-pressure $CO_2$ stream 922. The recovery of $CO_2$ at a higher pressure may facilitate various methods of disposal, including pumping the $CO_2$ into the ground for deep underground containment or for use in EOR.

The heated acid gas stream 920 may contain a concentration of $H_2S$. The $H_2S$ may react with $SO_2$ in a hot solvent stream 924 that may exit a bottom outlet of the $H_2S$ absorber reactor 910. The hot solvent stream 924 may include dissolved $SO_2$, dissolved $S_x$, liquid $S_x$ droplets, and residual amounts of $H_2S$ and $CO_2$. The hot solvent stream 924 can pass through a cooler 926 where its temperature may be lowered. The cooler 926 may provide a sufficient temperature drop to convert the liquid $S_x$ in the hot solvent stream 924 into solid $S_8$ crystals. A sulfur separator 930 may separate out the $S_8$ crystals to form a crystallized $S_8$ stream 932 where the $S_8$ crystals can be later handled for storage or disposal.

Prior to start-up, the main process loop of FIG. 9 may be partially filled with a stream of solvent 934 and dissolved $SO_2$ for the direct treatment and conversion of the $H_2S$, within the acid gas stream 920, to form elemental $S_x$. In some embodiments, the solvent 934 can include CrystaSulf or an ionic liquid such as an imidazolium-based liquid, among others. The solvent 934 circulating in the process loop may mix with an injected stream of $SO_2$ 935, which may be produced off-site, and with an existing $SO_2$ concentration already within the process loop so that elemental $S_x$ may be recovered in a single conversion process. The combination of the solvent stream 934 and the $SO_2$ streams may form a treating solvent that mixes with the aforementioned acid gas stream 928. The combined streams may form a solvent stream 936 that may be continually circulated within the process loop.

The solvent stream 936 may exit the sulfur separator 930, where its pressure may be increased by a pump 937 to facilitate its flow into a solvent heater 940. The solvent heater 940 may be utilized to generate a heated solvent stream 942, which may be fed to a $H_2S$ absorber reactor 944. To ensure conversion of $H_2S$ to elemental $S_x$, the aforementioned stream of heated acid gas 920 generated in the cryogenic distillation column 904 may be also fed to the $H_2S$ absorber reactor 944 to supply an adequate concentration of $H_2S$. Within the $H_2S$ absorber reactor 944, $H_2S$ concentration in the solvent stream 942 and the $H_2S$ concentration in the acid gas stream 920 may be converted to $S_x$, by reaction with the $SO_2$. Additionally, a stream of $CO_2$ 946 may be separated out of the reactor 944 and processed for later disposal or injection.

A processed solvent stream 948 exiting the $H_2S$ absorber reactor 944 may include generated $S_x$, along with $SO_2$, and may flow to a solvent cooler/sulfur recovery unit 950. In the unit 950, the processed solvent stream 948 may be cooled and an elemental $S_x$ stream 952 may be separated from the solvent stream 948 and directed to storage or disposal.

The processed solvent stream 954 may exit the unit 950, where its pressure may be boosted by a pump 955 to facilitate its continued flow through the process. Additionally, in some embodiments, the temperature of an overhead cooled solvent stream 954 may not be sufficient to purposely aid the next conversion reaction. Therefore, a heater 956 may be included to raise the temperature of the cooled solvent stream 954 to generate a heated solvent stream 958, which may then flow to another $H_2S$ absorber reactor 960. Similar to the operation of the preceding $H_2S$ absorber reactor 944, the absorber reactor 960 may convert $H_2S$ to $S_x$, in the presence of $SO_2$. Again, a heated liquid acid gas stream 920 from the cryogenic distillation column 904 may be injected into the $H_2S$ absorber reactor 960 to stimulate the conversion reaction and to produce a $CO_2$ stream 962 that may exit the $H_2S$ absorber reactor 960.

A solvent stream 964 may then be fed to another solvent cooler/sulfur recovery unit 966 to generate a separate $S_x$ stream 968. Thereafter, the cooled solvent stream 970 may be directed to a water removal system 972 using an injected dry gas stream 974 to remove moisture and to produce a wet gas stream 976 that may be later disposed and a regenerated non-aqueous solvent stream 977. The regenerated non-aqueous solvent stream 977 may have its pressure increased by pump 978 to facilitate an increased flow rate, as it may be recycled back into the initial H$_2$S absorber 910 to repeat the circulation process loop until sufficient conversion of H$_2$S to S$_x$ can be achieved.

Figure 10:
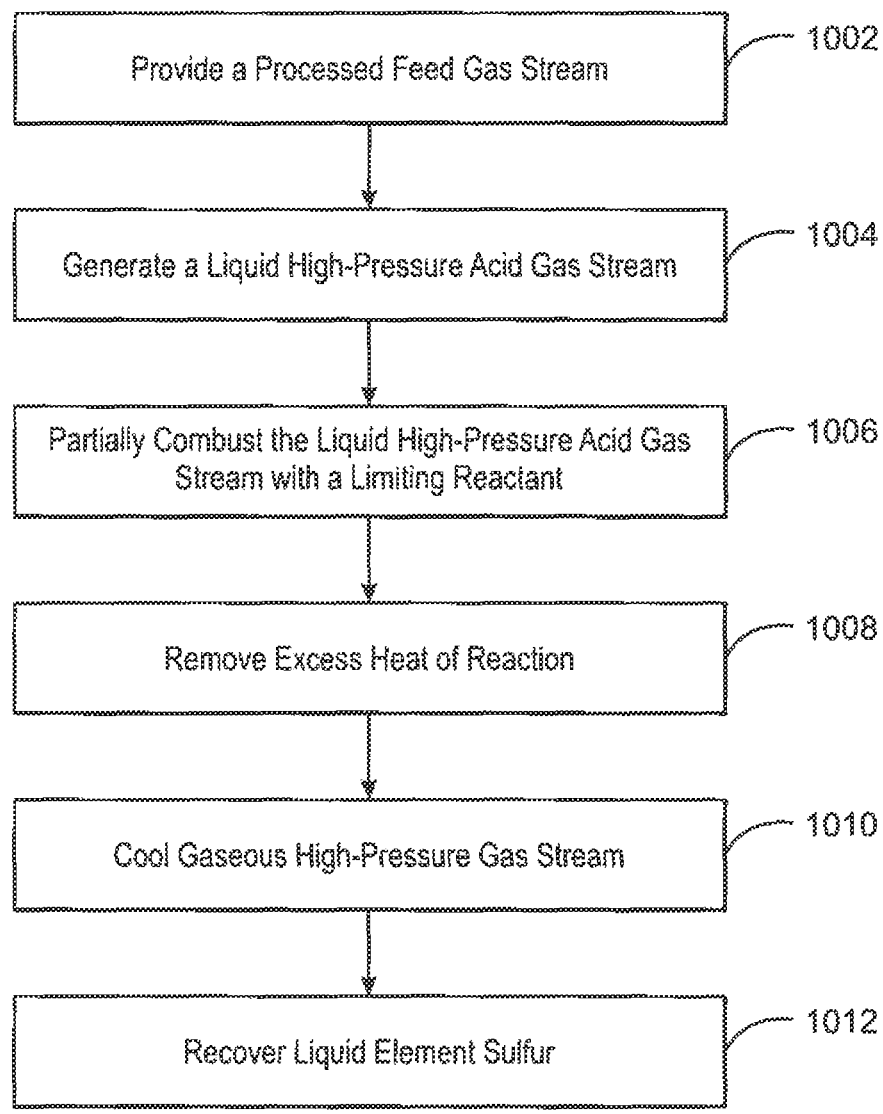
FIG. 10 is a process flow diagram of a method of generating elemental sulfur using a high-pressure Claus process including shell-and-tube reactors.

FIG. 10 is a process flow diagram of a method 1000 of generating elemental sulfur using a high-pressure Claus process including shell-and-tube reactors. The method 1000 begins at block 1002 where a processed feed gas stream is provided. At block 1004, a liquid high-pressure feed gas stream is generated. At block 1006, the liquid high-pressure feed gas stream, including a limiting reactant, is partially combusted. At block 1008, excess heat of reaction is removed primarily through the use of shell-and-tube reactors as described with respect to FIG. 4. At block 1010, the high-pressure gas stream is cooled in a condenser. Thereafter, at block 1012, elemental liquid S$_x$ is recovered, as described with respect to FIG. 5.

It should be understood that not all of the blocks of FIG. 10 may be used or needed in every embodiment. Depending on the service, such as additional materials added, mixing and separation techniques, specifications related to temperatures, concentrations, pressures, and the like, different blocks may be added or removed.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A system for generating elemental sulfur, comprising:
a gas treatment system to provide a processed feed gas comprising carbon dioxide, hydrogen sulfide, and hydrocarbons;
a distillation column comprising a rectifying section, a freeze zone section, and a stripping section, wherein the distillation column is configured to receive the processed feed gas, freeze carbon dioxide from the processed feed gas in the freeze zone section, and generate a natural gas stream and a liquid high-pressure acid gas stream, wherein the liquid high-pressure acid gas stream comprises hydrogen sulfide and carbon dioxide and is at a pressure of at least 500 psig;
a reactor configured to receive a portion of the liquid high-pressure acid gas stream and to partially combust the portion of the liquid high-pressure acid gas stream to generate a limiting reactant;
a plurality of reactors configured with a shell side and a tube side, wherein the tube side comprises a plurality of reaction tubes, and wherein a reaction in each of the reaction tubes between a portion of the liquid high-pressure acid gas stream from the distillation column and the limiting reactant produces a partially-reacted high-pressure acid gas containing elemental sulfur;
a plurality of condensers configured to condense the partially-reacted high-pressure acid gas and form an overhead acid gas stream and a liquid elemental sulfur stream; and
a plurality of separators configured to recover elemental sulfur.

2. The system of claim 1, wherein the high-pressure acid gas stream is at a pressure of from at least 500 psig to 1000 psig.

3. The system of claim 1, wherein the processed feed gas comprises substantially carbon dioxide (CO$_2$), hydrogen sulfide (H$_2$S), and hydrocarbons.

4. The system of claim 1, wherein the limiting reactant is injected into each of the plurality of reactors.

5. The system of claim 1, wherein the limiting reactant is sulfur dioxide (SO$_2$).

6. The system of claim 1, wherein the shell side of each of the plurality of reactors circulates a fluid medium to remove a substantial amount of heat due to an exothermic reaction.

7. The system of claim 1, wherein the plurality of separators comprises a sulfur trap to collect and direct the elemental sulfur into a single liquid sulfur vessel.

8. The system of claim 1, comprising a plurality of heaters to reheat the partially-reacted high-pressure gas stream to prevent elemental sulfur from condensing in the reactors.

9. The system of claim 1, wherein the partially-reacted high-pressure acid gas stream circulates through the plurality of reactors, the plurality of condensers, and the plurality of separators.

10. The system of claim 1, wherein the partially-reacted high-pressure acid gas stream from a final reactor is a vaporized high-pressure gas stream that is substantially comprised of high-pressure CO$_2$ and substantially free of H$_2$S.

11. The system of claim 10, wherein the vaporized high-pressure gas stream from the final reactor is recovered for enhanced oil recovery (EOR) using CO$_2$.

12. The system of claim 1, comprising a prilling tank configured to convert the elemental sulfur into solid sulfur prills.

13. A system for generating elemental sulfur from a high-pressure acid gas stream, comprising:
a distillation column comprising a rectifying section, a freeze zone section, and a stripping section, wherein the distillation column is configured to receive a feed gas stream comprising carbon dioxide, hydrogen sulphide, and hydrocarbons, freeze carbon dioxide from the feed gas stream, and provide a high-pressure liquid gas stream comprising hydrogen sulfide and carbon dioxide;
a plurality of shell and tube reactors, wherein the tubes of the shell and tube reactors are injected with the high-pressure liquid acid gas stream and a recirculating solvent and are configured to produce dissolved elemental sulfur in an exothermic reaction;
a plurality of coolers configured to crystallize the dissolved elemental sulfur and to separate crystallized elemental sulfur from gaseous products formed in each of the plurality of shell and tube reactors.

14. The system of claim 13, comprising a gas processing system configured to feed a processed gas to the distillation column.

15. The system of claim 13, wherein the each of the plurality of shell and tube reactors is an absorber reactor configured to react hydrogen sulfide (H$_2$S) from the high-pressure liquid gas stream with a limiting reactant to produce elemental sulfur.

16. The system of claim 15, wherein the shell and tube reactors releases carbon dioxide (CO$_2$) from the high-pressure liquid gas stream of the distillation column.

17. The system of claim 15, wherein the limiting reactant furthers a reaction between the H$_2$S in the high-pressure liquid gas stream from the distillation column and the limiting reactant to produce the dissolved elemental sulfur.

18. The system of claim 13, wherein the plurality of coolers includes a hydro-cyclone to collect the crystallized elemental sulfur.

19. A method for generating elemental sulfur, comprising providing a processed feed gas stream;
feeding the processed feed gas stream to a distillation column comprising a rectifying section, a freeze zone section, and a stripping section;
generating a liquid high-pressure acid gas stream from the processed feed gas stream in the distillation column, wherein the liquid high-pressure acid gas stream is at a pressure of at least 500 psig and comprises $H_2S$ and $CO_2$;
partially reacting the liquid high-pressure acid gas stream with a limiting reactant in a shell and tube reactor to produce a gaseous high-pressure stream containing elemental sulfur;
removing excess heat of reaction using the shell and tube reactor generated during the production of the gaseous high-pressure stream;
cooling the gaseous high-pressure stream to provide a liquid high-pressure stream; and
separating the liquid high-pressure stream out of the gaseous high-pressure stream to recover elemental sulfur.

20. The method of claim 19, wherein the processed feed gas stream comprises substantially carbon dioxide ($CO_2$), hydrogen sulfide ($H_2S$), and hydrocarbons.

21. The method of claim 19, comprising oxidizing a portion of the liquid high-pressure acid gas stream in a furnace to generate the limiting reactant.

22. The method of claim 19, comprising injecting the limiting reactant into the shell and tube reactor.

23. The method of claim 19, comprising:
forming droplets of elemental sulfur; and
cooling the droplets to form sulfur prills.

* * * * *